United States Patent
Kim et al.

(10) Patent No.: US 10,587,007 B2
(45) Date of Patent: Mar. 10, 2020

(54) LITHIUM SECONDARY BATTERY ELECTROLYTE AND LITHIUM SECONDARY BATTERY COMPRISING SAME

(71) Applicant: SK Innovation Co., Ltd., Seoul (KR)

(72) Inventors: Jin Sung Kim, Daejeon (KR); Hyo Seung Park, Daejeon (KR); Seong Il Lee, Daejeon (KR); Kwang Kuk Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 237 days.

(21) Appl. No.: 15/104,666

(22) PCT Filed: Dec. 19, 2014

(86) PCT No.: PCT/KR2014/012554
§ 371 (c)(1),
(2) Date: Jun. 15, 2016

(87) PCT Pub. No.: WO2015/093882
PCT Pub. Date: Jun. 25, 2015

(65) Prior Publication Data
US 2016/0329599 A1    Nov. 10, 2016

(30) Foreign Application Priority Data

Dec. 19, 2013 (KR) .......... 10-2013-0159659
Dec. 18, 2014 (KR) .......... 10-2014-0182968

(51) Int. Cl.
*H01M 10/0567* (2010.01)
*H01M 10/0525* (2010.01)
*H01M 10/0568* (2010.01)

(52) U.S. Cl.
CPC ... *H01M 10/0567* (2013.01); *H01M 10/0525* (2013.01); *H01M 10/0568* (2013.01); *H01M 2300/0025* (2013.01)

(58) Field of Classification Search
CPC ......... H01M 10/0567; H01M 10/0568; H01M 10/0525
See application file for complete search history.

(56) References Cited

U.S. PATENT DOCUMENTS

| 5,879,834 | A | 3/1999 | Mao |
| 7,445,872 | B2 | 11/2008 | Kim et al. |
| 7,494,745 | B2 | 2/2009 | Kim et al. |
| 7,611,801 | B2 | 11/2009 | Yamaguchi et al. |
| 7,781,106 | B2 | 8/2010 | Abe et al. |
| 2007/0178380 | A1 * | 8/2007 | Iwanaga ........... H01M 10/0567 429/231.4 |
| 2014/0370392 | A1 * | 12/2014 | Mengqun ........... H01M 4/131 429/231.8 |

FOREIGN PATENT DOCUMENTS

| JP | 2002260725 A | 9/2002 | |
| JP | 2002367674 A | 12/2002 | |
| KR | 100472512 B1 | 3/2005 | |
| KR | 20060048262 A | 5/2006 | |
| KR | 20060078702 A | 7/2006 | |
| KR | 20110079773 A | 7/2011 | |
| WO | 2014095407 A1 | 6/2014 | |
| WO | WO 2014095407 A1 * | 6/2014 | .......... H01M 10/052 |

* cited by examiner

*Primary Examiner* — Karie O'Neill Apicella
(74) *Attorney, Agent, or Firm* — The Webb Law Firm

(57) ABSTRACT

Provided are a lithium secondary battery electrolyte and a lithium secondary battery. The lithium secondary battery electrolyte includes a lithium salt, non-aqueous organic solvent, and an oxalate derivative. The lithium secondary battery includes a cathode, an anode, a separator, and the lithium secondary battery electrolyte. The lithium secondary battery electrolyte has excellent high-temperature stability, a high discharge capacity at a low temperature, and excellent lifespan characteristics.

16 Claims, No Drawings

LITHIUM SECONDARY BATTERY ELECTROLYTE AND LITHIUM SECONDARY BATTERY COMPRISING SAME

CROSS-REFERENCE TO RELATED APPLICATIONS

This application is the United States national phase of International Application No. PCT/KR2014/012554 filed Dec. 19, 2014, and claims priority to Korean Patent Application Nos. 10-2013-0159659 and 10-2014-0182968, filed Dec. 19, 2013 and Dec. 18, 2014, respectively, the disclosures of which are hereby incorporated in their entirety by reference.

BACKGROUND OF THE INVENTION

Technical Field

The present invention relates to a lithium secondary battery electrolyte and a lithium secondary battery including the same, and more specifically, to a lithium secondary battery electrolyte including an oxalate derivative and a lithium secondary battery including the same.

Background Art

In recent years, as portable electronic devices have widely spread, the portable electronic devices also have been rapidly required to have a small size, light weight, and a thin thickness. In accordance with this trend, a secondary battery capable of having a small sized and light weight battery serving as a power supply, being charged and discharged over a long time, and having highly efficient characteristic, has been strongly demanded to be developed.

Among secondary batteries applied in recent years, a lithium secondary battery developed in the early 1990s has been prominent due to high operating voltage and remarkably high energy density as compared to conventional batteries such as Ni-MH battery, Ni—Cd battery, lead sulfate battery, etc., using an aqueous solution electrolyte. However, the lithium secondary battery has safety problems such as ignition, explosion, etc., since it uses a non-aqueous electrolyte, and the problems become intensified as a capacity density of a battery is increased.

A major problem of the secondary battery having the non-aqueous electrolyte is reduction in stability of a battery occurring at the time of continuously charging the battery. One of the causes that may affect the reduction in stability is heat generation according to structural breakdown of a cathode. Operating principle thereof is as follows. That is, a cathode active material of a non-aqueous electrolyte battery consists of a lithium-containing metal oxide capable of absorbing and desorbing lithium and/or lithium ions, wherein the cathode active material is modified into a thermally unstable structure since a large amount of lithium is released during over-charging. When a battery temperature reaches a critical temperature due to physical external impact, such as high temperature exposure, etc., in such an overcharged state, oxygen is released from a cathode active material having an unstable structure, and the released oxygen causes an exothermic decomposition reaction with an electrolyte solvent, etc. In particular, since combustion of the electrolyte solution is further accelerated by the oxygen released from the cathode, the ignition and explosion of the battery due to thermal runaway are caused by a series of exothermic reactions.

In order to control the ignition or explosion according to the increase in temperature in battery as described above, a method of adding an aromatic compound as a redox shuttle additive in the electrolyte solution is used. For example, Japanese Patent Laid-Open Publication No. 2002-260725 discloses a non-aqueous lithium ion battery capable of preventing overcharge current and thermal runaway phenomenon by using an aromatic compound such as biphenyl. In addition, U.S. Pat. No. 5,879,834 discloses a method of improving battery stability by adding a small amount of aromatic compounds such as biphenyl, 3-chlorothiophene, etc., to be electrochemically polymerized in an abnormal over-voltage state, thereby increasing internal resistance.

However, in the case of using additives such as biphenyl, etc., in the normal operating voltage, when relatively high voltage is locally generated, the additive is gradually decomposed in a charging and discharging process, or when the battery is discharged at a high temperature for a long time, amounts of biphenyl, etc., are gradually reduced, such that after 300 cycles of the charging and discharging process, there are problems in that safety may not be guaranteed, storage characteristic is reduced, etc.

Therefore, research into technology of improving stability at a high temperature and a low temperature while maintaining a high capacity retention rate has still been demanded.

SUMMARY OF THE INVENTION

Disclosure

Technical Problem

An object of the present invention is to provide a lithium secondary battery electrolyte having excellent high-temperature and low-temperature characteristics while excellently maintaining basic performance such as highly efficient charge and discharge characteristic, lifespan characteristic, etc., and a lithium secondary battery including the same.

Technical Solution

In one general aspect, a lithium secondary battery electrolyte includes:
a lithium salt;
a non-aqueous organic solvent; and
an oxalate derivative represented by Chemical Formula 1 below:

[Chemical Formula 1]

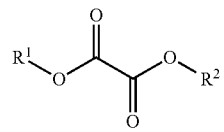

in Chemical Formula 1,
$R^1$ is (C1-C10)alkyl substituted with at least one fluorine; and
$R^2$ is trifluoromethyl, (C1-C10)alkyl, or (C6-C12)ar(C1-C10)alkyl, wherein the alkyl and aralkyl of $R^2$ may be further substituted with halogen or (C1-C10)alkyl.

In Chemical Formula 1, $R^2$ may be trifluoromethyl, (C1-C5)alkyl or (C1-C5)alkyl substituted with halogen.

The Chemical Formula 1 may be selected from the following structures, but the present invention is not limited thereto:

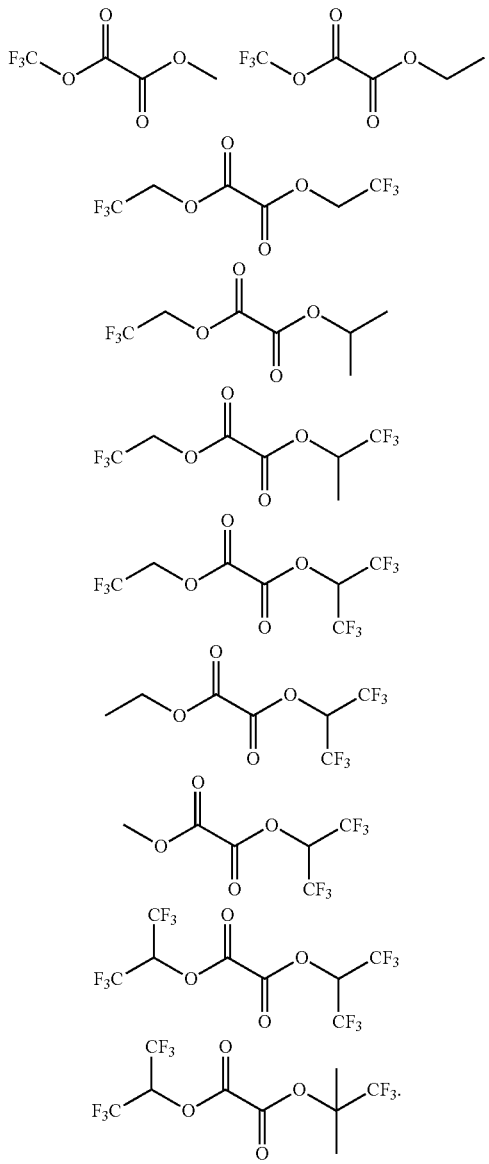

The oxalate derivative represented by Chemical Formula 1 may have a content of 1 wt % to 5 wt % based on total weight of the secondary battery electrolyte.

The secondary battery electrolyte may further include at least one additive selected from the group consisting of an oxalatoborate-based compound, a carbonate-based compound substituted with fluorine, a vinylidene carbonate-based compound and a sulfinyl group-containing compound.

The secondary battery electrolyte may further include at least one additive selected from the group consisting of lithiumdifluoro oxalatoborate (LiFOB), lithium bisoxalatoborate (LiB($C_2O_4$)$_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone and propene sultone (PRS).

The additive may have a content of 0.1 wt % to 5.0 wt % based on total weight of the secondary battery electrolyte.

The non-aqueous organic solvent may be selected from a cyclic carbonate-based solvent, a linear carbonate-based solvent and a mixed solvent thereof, and the cyclic carbonate may be selected from the group consisting of ethylene carbonate, propylene carbonate, butylene carbonate, vinylene carbonate, vinyl ethylene carbonate, fluoroethylene carbonate, and mixtures thereof, and the linear carbonate may be selected from the group consisting of dimethyl carbonate, diethyl carbonate, dipropyl carbonate, ethyl methyl carbonate, methyl propyl carbonate, methyl isopropyl carbonate, ethyl propyl carbonate, and mixtures thereof.

A mixed volume ratio of the linear carbonate-based solvent and the cyclic carbonate-based solvent included in the non-aqueous organic solvent may be 1 to 9:1

The lithium salt may be at least one selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein x and y are natural numbers), LiCl, LiI and $LiB(C_2O_4)_2$.

The lithium salt may be present at a concentration of 0.1 M to 2.0 M.

In another general aspect, there is provided a lithium secondary battery including the secondary battery electrolyte as described above.

Advantageous Effects

The lithium secondary battery electrolyte according to the present invention may include an oxalate derivative to remarkably reduce a swelling phenomenon in which a secondary battery swells at a high temperature, thereby having excellent high-temperature storage characteristic.

In addition, the lithium secondary battery electrolyte according to the present invention may include an oxalate derivative having a functional group substituted with at least one fluorine to thereby have significantly excellent capacity recovery rate at a high temperature and significantly excellent discharge capacity at a low temperature.

Further, the lithium secondary battery electrolyte according to the present invention may include the oxalate derivative represented by Chemical Formula 1, and may further include at least one additive selected from the group consisting of an oxalatoborate-based compound, a carbonate-based compound substituted with fluorine, a vinylidene carbonate-based compound and a sulfinyl group-containing compound to thereby have a significantly excellent lifespan characteristic, significantly excellent high-temperature stability and low temperature characteristics.

Further, the lithium secondary battery according to the present invention may employ the lithium secondary battery electrolyte including the oxalate derivative to thereby have excellent high-temperature storage stability and low-temperature characteristics while excellently maintaining basic performance such as a highly efficient charge and discharge characteristic, a lifespan characteristic, etc.

DESCRIPTION OF THE INVENTION

Best Mode

Hereinafter, the present invention will be described in detail. Here, unless technical and scientific terms used herein are defined otherwise, they have meanings understood by those skilled in the art to which the present invention pertains. Known functions and components which obscure the description and the accompanying drawings of the present invention with unnecessary detail will be omitted.

The present invention relates to a lithium secondary battery electrolyte for providing a battery having significantly excellent discharge capacity at a low temperature while having excellent high-temperature storage characteristic and excellent lifespan characteristic.

The present invention provides the lithium secondary battery electrolyte including: a lithium salt; a non-aqueous organic solvent; and an oxalate derivative represented by Chemical Formula 1 below:

[Chemical Formula 1]

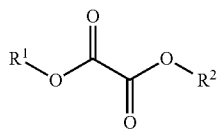

in Chemical Formula 1, $R^1$ is (C1-C10)alkyl substituted with at least one fluorine; and $R^2$ is trifluoromethyl, (C1-C10)alkyl, or (C6-C12)ar(C1-C10)alkyl, wherein the alkyl and aralkyl of $R^2$ may be further substituted with halogen or (C1-C10)alkyl.

The secondary battery electrolyte of the present invention may include the oxalate derivative, specifically, the oxalate derivative represented by Chemical Formula 1 having a specific structure having alkyl substituted with at least one fluorine group, more specifically, a trifluoromethyl group as a substituent group, thereby having excellent capacity recovery rate and stability at a high temperature and significantly excellent discharge capacity at a low temperature.

In the lithium secondary battery electrolyte according to an exemplary embodiment of the present invention, in Chemical Formula 1, preferably, $R^2$ may be trifluoromethyl, (C1-C5)alkyl, or (C1-C5)alkyl substituted with halogen, specifically, $R^2$ according to an exemplary embodiment of the present invention may be (C1-C5)alkyl, or (C1-C5)alkyl substituted with halogen.

The halogen according to an exemplary embodiment of the present invention may be preferably fluorine, and accordingly, (C1-C5)alkyl substituted with halogen according to an exemplary embodiment of the present invention may be preferably alkyl substituted with at least one fluorine.

More specifically, the oxalate derivative of the present invention may be selected from the following structures, but the present invention is not limited thereto:

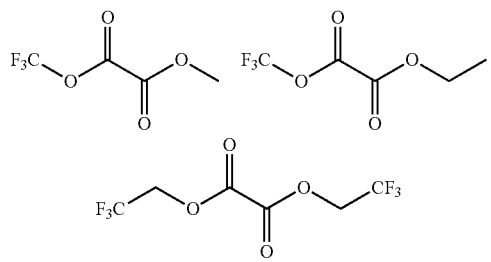

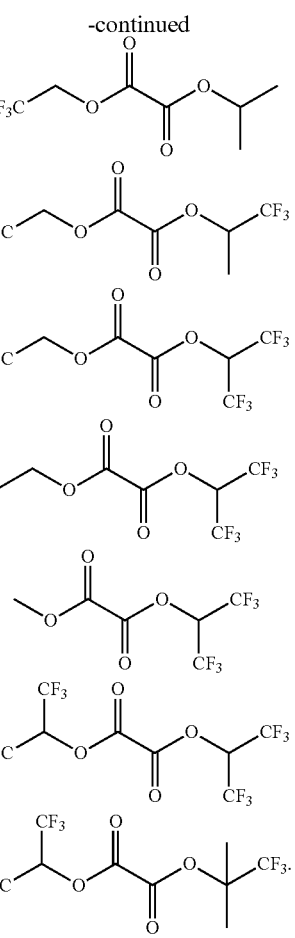

"alkyl", "alkoxy" and other substituents including other "alkyl" portions described in the present invention include both a linear chain form or a branched chain form, and have 1 to 10 carbon atoms, preferably 1 to 6 carbon atoms, and more preferably, 1 to 4 carbon atoms.

In addition, "aryl" described in the present invention, which is an organic radical derived from aromatic hydrocarbon by removal of one hydrogen, includes single or fused ring system properly including 4 to 7 ring atoms, preferably, 5 or 6 ring atoms in each ring, and may include a plurality of aryls linked with a single bond. Specific examples of the aryl may include phenyl, naphthyl, biphenyl, anthryl, indenyl, fluorenyl, and the like, but the present invention is not limited thereto.

The alkyl substituted with at least one fluorine group according to the present invention means that at least one hydrogen present in the alkyl is substituted with fluorine.

In the lithium secondary battery electrolyte according to an exemplary embodiment of the present invention, the oxalate derivative represented by Chemical Formula 1 may have a content of 1 wt % to 5 wt % based on total weight of the secondary battery electrolyte, and more preferably, may have a content of 1 wt % to 3 wt % in view of high-temperature stability. When the content of the oxalate derivative represented by Chemical Formula 1 is less than 1 wt %, high-temperature stability is low, improvement of the capacity retention rate is not sufficient, etc., such that the addition effect of the oxalate derivative is not obtained, and an effect in which discharge capacity, output, etc., of the lithium secondary battery are improved, is not sufficient.

When the content of the oxalate derivative is more than 5 wt %, lifespan deterioration rapidly occurs, etc., such that characteristics of the lithium secondary battery are rather decreased.

In the lithium secondary battery electrolyte according to an exemplary embodiment of the present invention, the lithium secondary battery electrolyte is a lifespan improving additive for improving a battery lifespan, and may further include at least one additive selected from the group consisting of an oxalatoborate-based compound, a carbonate-based compound substituted with fluorine, a vinylidene carbonate-based compound and a sulfinyl group-containing compound.

The oxalatoborate-based compound may be a compound represented by Chemical Formula 2 below or may be lithium bisoxalatoborate ($LiB(C_2O_4)_2$, LiBOB):

[Chemical Formula 2]

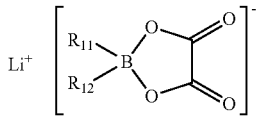

in Chemical Formula 2, $R_{11}$ and $R_{12}$ are each independently a halogen element, or a halogenated C1-C10 alkyl group.

Specific examples of the oxalatoborate-based additive may include $LiB(C_2O_4)F_2$ (lithiumdifluoro oxalatoborate: LiFOB), $LiB(C_2O_4)_2$ (lithium bisoxalatoborate: LiBOB), etc.

The carbonate-based compound substituted with fluorine may be fluoroethylene carbonate (FEC), difluoro ethylene carbonate (DFEC), fluorodimethyl carbonate (FDMC), fluoroethylmethyl carbonate (FEMC) or combinations thereof.

The vinylidene carbonate-based compound may be vinylene carbonate (VC), vinylethylene carbonate (VEC), or mixtures thereof.

The sulfinyl group (S=O)-containing compound may be sulfone, sulfite, sulfonate and sultone (cyclic sulfonate), and may be used alone or in combination. Specifically, the sulfone may be represented by Chemical Formula 3 below, and may be divinyl sulfone. The sulfite may be represented by Chemical Formula 4 below, and may be ethylene sulfite, or propylene sulfite. The sulfonate may be represented by Chemical Formula 5 below, and may be diallyl sulfonate. In addition, non-limiting examples of the sultone may include ethane sultone, propane sultone, butane sultone, ethene sultone, butene sultone, propene sultone, etc.

[Chemical Formula 3]

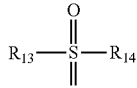

[Chemical Formula 4]

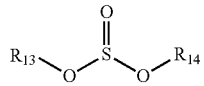

[Chemical Formula 5]

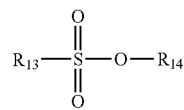

In Chemical Formulas 3, 4, and 5, $R_{13}$ and $R_{14}$ are each independently hydrogen, halogen atom, C1-C10 alkyl group, C2-C10 alkenyl group, halogen-substituted C1-C10 alkyl group or halogen-substituted C2-C10 alkenyl group.

In the lithium secondary battery electrolyte according to an exemplary embodiment of the present invention, more preferably, the electrolyte may further include an additive selected from the group consisting of lithiumdifluoro oxalatoborate (LiFOB), lithium bisoxalatoborate ($LiB(C_2O_4)_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone and propene sultone (PRS), and more preferably, may further include at least one additive selected from the group consisting of lithium bisoxalatoborate (LiB$(C_2O_4)_2$, LiBOB), vinylene carbonate (VC), vinylethylene carbonate (VEC), ethylene sulfite, ethane sultone, and propane sultone (PS).

In the lithium secondary battery electrolyte according to an exemplary embodiment of the present invention, the content of the additive is not largely limited, but may be 0.1 wt % to 5.0 wt %, and more preferably, 0.1 wt % to 3 wt %, based on total weight of the secondary battery electrolyte, in order to improve battery lifespan in the secondary battery electrolyte.

In the lithium secondary battery electrolyte according to an exemplary embodiment of the present invention, the non-aqueous organic solvent may include carbonate, ester, ether or ketone alone or a mixed solvent thereof, but preferably, may be selected from the cyclic carbonate-based solvent, the linear carbonate-based solvent and the mixed solvent thereof, and the most preferably, a mixed solvent of the cyclic carbonate-based solvent and the linear carbonate-based solvent. The cyclic carbonate-based solvent is capable of sufficiently dissociating lithium ions due to large polarity; meanwhile, has small ion conductivity due to large viscosity. Therefore, when the cyclic carbonate-based solvent is mixed and used with the linear carbonate-based solvent having small polarity but low viscosity, characteristics of the lithium secondary battery may be optimized.

The cyclic carbonate-based solvent may be selected from the group consisting of ethylene carbonate, propylene carbonate, butylene carbonate, vinylene carbonate, vinyl ethylene carbonate, fluoroethylene carbonate, and mixtures thereof, and the linear carbonate-based solvent may be selected from the group consisting of dimethyl carbonate, diethyl carbonate, dipropyl carbonate, ethyl methyl carbonate, methyl propyl carbonate, methyl isopropyl carbonate, ethyl propyl carbonate, and mixtures thereof.

In the lithium secondary battery electrolyte according to an exemplary embodiment of the present invention, the non-aqueous organic solvent is a mixed solvent of the cyclic carbonate-based solvent and the linear carbonate-based solvent, wherein a mixed volume ratio of the linear carbonate-based solvent and the cyclic carbonate-based solvent included in the non-aqueous organic solvent is 1 to 9:1, preferably, 1.5 to 4:1.

In a high-voltage lithium secondary battery electrolyte according to an exemplary embodiment of the present invention, the lithium salt is not limited, but may be at least one selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein x and y are natural numbers), LiCl, LiI and $LiB(C_2O_4)_2$.

The lithium salt may preferably have a concentration ranging from 0.1 M to 2.0 M, and more preferably, 0.7 M to 1.6 M. When the concentration of the lithium salt is less than 0.1 M, conductivity of the electrolyte is decreased, which deteriorates performance of the electrolyte, and when the concentration of the lithium salt is more than 2.0 M, viscosity of the electrolyte is increased, which decreases mobility of lithium ions. The lithium salt acts as a source of lithium ions in the battery, which is possible to perform operation of a basic lithium secondary battery.

The lithium secondary battery electrolyte of the present invention is generally stable at a temperature range of −20° C. to 60° C., and maintains electrochemically stable characteristics even at a voltage of 4.4V, such that the lithium secondary battery electrolyte of the present invention may be applied to all lithium secondary batteries such as a lithium ion battery, a lithium polymer battery, etc.

In addition, the present invention provides a lithium secondary battery including the secondary battery electrolyte as described above.

Non-limiting examples of the secondary battery may include a lithium metal secondary battery, a lithium ion secondary battery, a lithium polymer secondary battery, a lithium ion polymer secondary battery, etc.

The lithium secondary battery manufactured from the lithium secondary battery electrolyte according to the present invention has 75% or more of high-temperature storage efficiency. Simultaneously, at the time of leaving the battery at a high temperature for a long time, the lithium secondary battery has an increase rate of battery thickness at 1% to 15%, and more preferably, 1% to 9%, which is significantly low.

The lithium secondary battery of the present invention includes a cathode and an anode.

The cathode includes a cathode active material capable of absorbing and desorbing lithium ions, and the cathode active material is preferably a complex metal oxide including at least one selected from cobalt, manganese, and nickel, and lithium. A composition rate between the metals may be various, and the cathode active material may further include one element selected from the group consisting of Mg, Al, Co, K, Na, Ca, Si, Ti, Sn, V, Ge, Ga, B, As, Zr, Mn, Cr, Fe, Sr, V and rare earth elements in addition to these metals. Specific example of the cathode active material may include a compound represented by any one of the following Chemical Formulas:

$Li_a A_{1-b}B_bD_2$ (wherein $0.90 \leq a \leq 1.8$, and $0 \leq b \leq 0.5$); $Li_a E_{1-b}B_bO_{2-c}D_c$ (wherein $0.90 \leq a \leq 1.8$, $0 \leq b \leq 0.5$, and $0 \leq c \leq 0.05$); $LiE_{2-b}B_bO_{4-c}D_c$ (wherein $0 \leq b \leq 0.5$, and $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB_cO_{2-\alpha}F_2$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_b Co_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In Chemical Formula above, A may be Ni, Co, Mn or combinations thereof; B may be Al, Ni, Co, Mn, Cr, Fe, Mg, Sr, V, rare earth elements, or combinations thereof; D may be O, F, S, P, or combinations thereof; E may be Co, Mn or a combination thereof; F may be F, S, P or combinations thereof; G may be Al, Cr, Mn, Fe, Mg, La, Ce, Sr, V, or combinations thereof; Q may be Ti, Mo, Mn, or combinations thereof; I may be Cr, V, Fe, Sc, Y or combinations thereof; and J may be V, Cr, Mn, Co, Ni, Cu, or combinations thereof.

The anode includes an anode active material capable of absorbing and desorbing lithium ions, and the anode active material may be carbon materials such as crystalline carbon, amorphous carbon, a carbon composite material, a carbon fiber, etc., lithium metal, alloys of lithium and other elements, etc. For example, the amorphous carbon may be hard carbon, cokes, mesocarbon microbead (MCMB) fired at 1500° C. or less, mesophase pitch-based carbon fiber (MPCF), etc. The crystalline carbon may be graphite-based materials, and specifically, may be natural graphite, graphitized cokes, graphitized MCMB, graphitized MPCF, etc. The carbon material is preferably a material in which an interlayer distance is 3.35 Å to 3.38 Å, and LC (crystallite size) by X-ray diffraction is at least 20 nm. Other elements forming alloy with lithium may be aluminum, zinc, bismuth, cadmium, antimony, silicon, lead, tin, gallium or indium.

The cathode or the anode may be prepared by dispersing an electrode active material, a binder and a conductive material, and if necessary, a thickening agent, in a solvent, to prepare an electrode slurry composition and applying the slurry composition onto an electrode current collector. Aluminum, aluminum alloy, etc., may be generally used as a cathode current collector, and copper, copper alloy, etc., may be generally used as an anode current collector. The cathode current collector and the anode current collector may have a foil type or a mesh type.

The binder is a material serving to form a paste of an active material, mutual adhesion of the active material, adhesion with a current collector, buffer effect to expansion and contraction of the active material, etc., for example, may include polyvinylidene fluoride (PVdF), a copolymer of polyhexafluoropropylene-polyvinylidene fluoride (PVdF/HFP), poly(vinyl acetate), polyvinyl alcohol, polyethylene oxide, polyvinylpyrrolidone, alkylated polyethylene oxide, polyvinyl ether, poly(methylmethacrylate), poly(ethyl acrylate), polytetrafluoroethylene, polyvinylchloride, polyacrylonitrile, polyvinylpyridine, styrene-butadiene rubber, acrylonitrile-butadiene rubber, etc. The content of the binder is 0.1 wt % to 30 wt %, preferably, 1 wt % to 10 wt % based on the electrode active material. When the content of the binder is excessively small, adhesion force between the electrode active material and the current collector is not sufficient, and when the content of the binder is excessively large, adhesion force therebetween is increased, but the content of the electrode active material is decreased by the increased adhesion force thereof, which is disadvantageous for obtaining high-capacity of battery.

The conductive material is used to provide conductivity to electrodes. The conductive material is not limited as long as it is an electronic conductive material without causing chemical changes in a battery to be manufactured, and may include at least one selected from the group consisting of a graphite-based conductive material, a carbon black-based conductive material, and a metallic conductive material or a metal compound-based conductive material. Examples of the graphite-based conductive material may include artificial graphite, natural graphite, etc., examples of the carbon black-based conductive material may include acetylene black, Ketjen black, Denka black, thermal black, channel black, etc., examples of the metallic conductive material or the metal compound-based conductive material may include tin, tin oxide, tin phosphate ($SnPO_4$), titanium oxide, potassium titanate, and perovskite materials such as $LaSrCoO_3$ and $LaSrMnO_3$. However, the conductive material of the present invention is not limited to the above-described conductive materials.

The content of the conductive material is preferably 0.1 wt % to 10 wt % based on the electrode active material. When the content of the conductive material is less than 0.1 wt %, an electrochemical characteristic is deteriorated, and when the content of the conductive material is more than 10 wt %, energy density per weight is reduced.

The thickening agent is not specifically limited as long as it is capable of controlling the viscosity of an active material slurry, and for example, may include carboxymethyl cellulose, hydroxymethyl cellulose, hydroxyethyl cellulose, hydroxypropyl cellulose, etc.

The solvent in which the electrode active material, the binder, the conductive material, etc., are dispersed, may include a non-aqueous solvent or a water-based solvent. Examples of the non-aqueous solvent may include N-methyl-2-pyrrolidone (NMP), dimethylformamide, dimethylacetamide, N,N-dimethylaminopropylamine, ethylene oxide, tetrahydrofuran, etc.

The lithium secondary battery of the present invention may include a separator preventing short circuit between the cathode and the anode and providing a moving path of lithium ions, wherein the separator may be polyolefin-based polymer membranes such as polypropylene, polyethylene, polyethylene/polypropylene, polyethylene/polypropylene/ polyethylene, polypropylene/polyethylene/polypropylene, etc., or multi-membranes, microporous films, woven fabrics, and non-woven fabrics thereof. Further, the separator may be a porous polyolefin film coated with resin having excellent stability.

The lithium secondary battery of the present invention may have various shapes such as a cylindrical shape, a pouch shape, etc., in addition to a square shape.

Hereinafter, Examples and Comparative Examples of the present invention will be described. However, the following examples are merely provided as preferable examples of the present invention. Therefore, it is to be noted that the present invention is not limited to the following examples. A base electrolyte may be formed by dissolving lithium salt such as $LiPF_6$ in a basic solvent, with an amount corresponding to a concentration of 1M, while assuming that all of the lithium salt is dissociated so that lithium ions have a concentration of 1M.

Preparation Example 1

Synthesis of bis(2,2,2-trifluoroethyl) oxalate (hereinafter, referred to as PEA46)

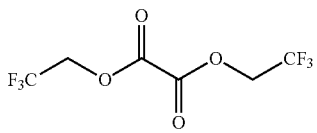 [SMILES: O=C(OCC(F)(F)F)C(=O)OCC(F)(F)F]

2,2,2-trifluoro ethanol (10.5 g) and triethylamine (10.6 g) were put into dichloromethane (100 mL) under nitrogen atmosphere, and stirred at 0° C. for 30 minutes. Oxalyl chloride (6.35 g) was slowly added dropwise to the cooled solution for 30 minutes, and the reaction solution was stirred at room temperature for 2 hours. An organic solution was washed with 1N hydrochloric acid aqueous solution (50 mL) two times, and washed with saturated sodium bicarbonate aqueous solution (50 mL) two times. The washed organic layer was dried by adding anhydrous magnesium sulfate, and filtered to remove magnesium sulfate, and distilled under reduced pressure to obtain bis(2,2,2-trifluoroethyl) oxalate (8.89 g).

$^1$H NMR ($CDCl_3$, 500 MHz): δ 4.67 (q, J=8.0 Hz, 4H)

Preparation Example 2

Synthesis of bis(1,1,1,3,3,3-hexafluoro-2-propyl) oxalate (hereinafter, referred to as PEA53

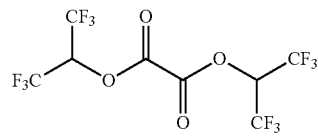

1,1,1,3,3,3-hexafluoro-2-propanol (17.6 g) and triethylamine (10.6 g) were put into diethyl ether (100 mL) under nitrogen atmosphere, and stirred at 0° C. for 30 minutes. Oxalyl chloride (6.35 g) was slowly added dropwise to the cooled solution for 30 minutes, and the reaction solution was stirred at room temperature for 2 hours. The solution was filtered to remove a solid, and the filtered solution was distilled under reduced pressure to obtain bis(1,1,1,3,3,3-hexafluoro-2-propyl)oxalate (9.75 g).

$^1$H NMR ($CDCl_3$, 500 MHz): δ 5.81 (heptet, J=5.5 Hz, 2H).

Preparation Example 3

Synthesis of dimethyl oxalate (hereinafter, referred to as PEA35)

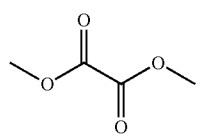

Methanol (3.36 g) and triethylamine (10.6 g) were put into dichloromethane (100 mL) under nitrogen atmosphere, and stirred at 0° C. for 30 minutes. Oxalyl chloride (6.35 g) was slowly added dropwise to the cooled solution for 30 minutes, and the reaction solution was stirred at room temperature for 2 hours. An organic solution was washed with 1N hydrochloric acid aqueous solution (50 mL) two times, and washed with saturated sodium bicarbonate aqueous solution (50 mL) two times. The washed organic layer was dried by adding anhydrous magnesium sulfate, and filtered to remove magnesium sulfate. A solvent of the filtered solution was removed by distillation under reduced pressure, and the obtained solution was recrystallized with diethyl ether and petroleum ether, to obtain dimethyl oxalate (4.13 g).

$^1$H NMR (CDCl$_3$, 500 MHz): δ 3.58 (s, 6H)

Examples 1 to 7 and Comparative Examples 1 to 3

An electrolyte was prepared by preparing a solution in which LiPF$_6$ is dissolved in a mixed solvent including ethylene carbonate (EC) and ethyl methyl carbonate (EMC) at a volume ratio of 3:7 so as to have a concentration of 1.0 M, as a basic electrolyte (1M LiPF$_6$, EC/EMC=3:7), and further including components shown in Table 1 below to the basic electrolyte.

A battery to which the non-aqueous electrolyte is applied, was prepared as follows.

A cathode slurry was prepared by mixing LiNiCoMnO$_2$ and LiMn$_2$O$_4$ as cathode active materials at a weight ratio of 1:1, and further mixing the mixture of cathode active materials, polyvinylidene fluoride (PVdF) as a binder, and carbon as a conductive material at a weight ratio of 92:4:4, and dispersing the obtained mixture in N-methyl-2-pyrrolidone. The slurry was coated on an aluminum foil having a thickness of 20 μm, dried and rolled to manufacture the cathode. An anode active material slurry was prepared by mixing artificial graphite as an anode active material, a styrene-butadiene rubber as a binder, and carboxymethyl cellulose as a thickening agent at a weight ratio of 96:2:2, and dispersing the mixture in water. The slurry was coated on a copper foil having a thickness of 15 μm, dried and rolled to manufacture the anode.

A cell was configured by stacking a film separator made of polyethylene (PE) and having a thickness of 25 μm between the manufactured electrodes, and using a pouch having a size of thickness 8 mm×width 270 mm×length 185 mm, and the non-aqueous electrolyte was injected to prepare a 25 Ah class lithium secondary battery for EV.

Performance of the 25 Ah class lithium secondary battery for EV as manufactured above was evaluated as follows. Evaluation factors were as follows.

*Evaluation Factors*

1. Discharge capacity at −20° C. with 1 C: A battery was charged at room temperature with 25 A, 4.2V CC-CV for 3 hours, left at −20° C. for 4 hours, and discharged with a current of 25 A up to 2.7V at CC, and available capacity (%) compared to initial capacity was measured.

2. Capacity recovery rate at 60° C. for 30 days: A battery was charged at room temperature with 25 A, 4.2V CC-CV for 3 hours, left at 60° C. for 30 days, and discharged with a current of 25 A up to 2.7V at CC, and a recovery rate (%) compared to initial capacity was measured.

3. Increase rate of thickness after being left at 60° C. for 30 days: A battery was charged at room temperature with 4.4V, 12.5 A CC-CV for 3 hours. Then, when a thickness of the battery is A, and a thickness of a battery after being left at 60° C. under atmospheric pressure for 30 days using a sealed thermostatic device is B, an increase rate of thickness was calculated as shown in Equation 1 below.

$$(B-A)/A \times 100 (\%)$$ [Equation 1]

4. Lifespan at room temperature: A charging process of a battery at room temperature with 4.4V, 50 A CC-CV for 3 hours, and a discharging process of the battery with 2.7V, a current of 25 A up to 2.7V, were repeated 500 times. Here, when a discharge capacity at a first cycle is C, a capacity retention rate in the lifespan was calculated by dividing a discharge capacity at 300th cycle by the discharge capacity at the first cycle.

TABLE 1

|  | Composition of electrolyte | After leaving battery at 60° C. for 30 days | | capacity | |
|  |  | Capacity recovery rate | Increase rate of thickness | retention rate in lifespan | discharge capacity at −20° C. |
| --- | --- | --- | --- | --- | --- |
| Example 1 | Basic electrode + PEA46 1 wt % | 75% | 14% | 75% | 85% |
| Example 2 | Basic electrolyte + PEA53 1 wt % | 82% | 7% | 83% | 88% |
| Example 3 | Basic electrolyte + PEA53 0.5 wt % | 80% | 9% | 81% | 85% |
| Example 4 | Basic electrolyte + PEA53 3 wt % | 79% | 5% | 79% | 82% |
| Example 5 | Basic electrolyte + PEA53 1 wt % + VC 1 wt % | 85% | 6% | 88% | 82% |
| Example 6 | Basic electrolyte + PEA53 1 wt % + VC 1 wt % + PS 1 wt % | 88% | 3% | 89% | 81% |
| Example 7 | Basic electrolyte + PEA53 1 wt % + VC 1 wt % + LiBOB 1 wt % | 89% | 4% | 90% | 86% |
| Comparative Example 1 | Basic electrolyte | 37% | 30% | 20% | 55% |
| Comparative Example 2 | Basic electrolyte + PEA35 1 wt % | 27% | 35% | 30% | 48% |
| Comparative Example 3 | Basic electrolyte + PEA35 1 wt % + VC 1 wt % + PS 1 wt % | 47% | 22% | 52% | 46% |

Basic electrolyte: 1M LiPF$_6$,
EC/EMC = 3:7LiBOB:Lithium-bis(Oxalato)BorateVC:Vinylene carbonatePS:1,3-propane sultone As shown in Table 1 above, it could be appreciated that the lithium secondary battery including the lithium secondary battery electrolyte according to the present invention had a high capacity recovery rate of 75% or more even after being left at 60° C. for 30 days, and had a significantly low increase rate of thickness at 3% to 14%.

On the contrary, it could be appreciated that the secondary battery electrolyte without including the oxalate derivative of the present invention or including an oxalate derivative that is not included in the oxalate derivative of the present invention had a low high-temperature capacity recovery rate, and had a significantly high increase rate of thickness at 22% to 35%, which deteriorates stability.

It is considered that the excellent effect is caused from the structure of oxalate represented by Chemical Formula 1 of the present invention. For example, it is considered that when the oxalate derivatives such as PEA46 and PEA53 of the present invention are reduced and decomposed on a surface of the anode, the fluorine functional group substituted in the oxalate derivative forms a stable SEI layer in a solid form, thereby significantly reducing internal resistance of the battery to largely improve low-temperature and high-temperature performance of the battery.

Meanwhile, PEA35 as the Comparative Example of the present invention is a compound having no fluorine substituted in the oxalate structure, and it is considered that when PEA35 is reduced and decomposed on a surface of the anode during a formation process, the methyl functional group substituted in the oxalate derivative is decomposed into gaseous components such as CO, $CO_2$, etc., such that it is not possible to form a stable coating layer in a polymer form on the surface of the anode.

Therefore, the oxalate derivative substituted with at least one fluorine group of the present invention necessarily has at least one fluorine group, and more preferably, at least one trifluoromethyl group in the oxalate derivative, thereby having more excellent high-temperature and low-temperature characteristics.

Moreover, the secondary battery electrolyte of the present invention may include the oxalate derivative represented by Chemical Formula 1, and may further include at least one additive selected from the group consisting of lithium bisoxalatoborate ($LiB(C_2O_4)_2$, LiBOB), vinylene carbonate (VC), vinylethylene carbonate (VEC), ethylene sulfite, ethane sultone, and propane sultone (PS), to more improve high-temperature storage stability and low-temperature discharge capacity and the lifespan characteristic, such that the lithium secondary battery including the secondary battery electrolyte of the present invention may have significantly high efficiency, stability and lifespan characteristics.

Although the exemplary embodiments of the present invention have been disclosed for more details as described above, those skilled in the art will appreciate that various modifications, additions and substitutions are possible, without departing from the scope and spirit of the invention as disclosed in the accompanying claims. Therefore, the future change in the exemplary embodiments of the present invention cannot depart from the technology of the present invention.

The invention claimed is:

1. A secondary battery electrolyte comprising:
a lithium salt;
a non-aqueous organic solvent; and
an oxalate derivative represented by Chemical Formula 1 below:

[Chemical Formula 1]

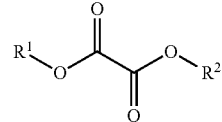

in Chemical Formula 1,
$R^1$ is (C1-C2)alkyl substituted with at least one fluorine; and
$R^2$ is trifluoromethyl, (C1-C2)alkyl, or (C6-C12)ar(C1-C10)alkyl, wherein the alkyl and aralkyl of $R^2$ may be further substituted with halogen.

2. The secondary battery electrolyte of claim 1, wherein the Chemical Formula 1 is selected from the following structures:

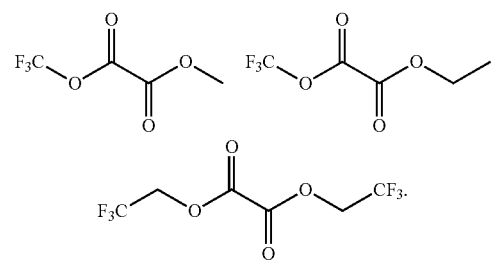

3. The secondary battery electrolyte of claim 1, wherein the oxalate derivative has a content of 1 wt % to 5 wt % based on total weight of the secondary battery electrolyte.

4. The secondary battery electrolyte of claim 1, wherein the non-aqueous organic solvent is selected from a cyclic carbonate-based solvent, a linear carbonate-based solvent and a mixed solvent thereof.

5. The secondary battery electrolyte of claim 4, wherein the cyclic carbonate is selected from the group consisting of ethylene carbonate, propylene carbonate, butylene carbonate, vinylene carbonate, vinyl ethylene carbonate, fluoroethylene carbonate, and mixtures thereof, and the linear carbonate is selected from the group consisting of dimethyl carbonate, diethyl carbonate, dipropyl carbonate, ethyl methyl carbonate, methyl propyl carbonate, methyl isopropyl carbonate, ethyl propyl carbonate, and mixtures thereof.

6. The secondary battery electrolyte of claim 4, wherein a mixed volume ratio of the linear carbonate-based solvent and the cyclic carbonate-based solvent included in the non-aqueous organic solvent is 1 to 9:1.

7. The secondary battery electrolyte of claim 1, wherein the lithium salt is at least one selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiA_1O_2$, $LiAlCl_4$, $LiN(C_xF_{2x+1}SO_2)(C_yF_{2y+1}SO_2)$ (wherein x and y are natural numbers), LiCl, LiI and $LiB(C_2O_4)_2$.

8. The secondary battery electrolyte of claim 1, wherein the lithium salt is present at a concentration of 0.1 M to 2.0 M.

9. A lithium secondary battery comprising a cathode, an anode, a separator, and the secondary battery electrolyte of claim 1.

10. The lithium secondary battery of claim 9, wherein the cathode comprises a cathode active material comprising a complex metal oxide that comprises at least one selected from cobalt, manganese, and nickel; and lithium.

11. The lithium secondary battery of claim 9, wherein the anode comprises a anode active material comprising a crystalline carbon, amorphous carbon, carbon composite, carbon fiber, lithium metal, or alloys of lithium and other elements.

12. The lithium secondary battery of claim 9, wherein the lithium secondary battery has 75% or more of high-temperature storage efficiency.

13. The lithium secondary battery of claim 12, wherein an increase rate of thickness after the lithium secondary battery is left at 60° C. under atmospheric pressure for 30 days is 1 to 15%.

14. The secondary battery electrolyte of claim 2, wherein the Chemical Formula 1 is

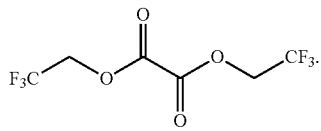 [SMILES: O=C(OCC(F)(F)F)C(=O)OCC(F)(F)F]

15. The secondary battery electrolyte of claim 1, further comprising an additive comprising vinylene carbonate (VC) and at least one of lithium bisoxalatoborate (LiB($C_2O_4$)$_2$, LiBOB) and propane sultone (PS).

16. The secondary battery electrolyte of claim 15, wherein the additive has a content of 0.1 wt % to 5.0 wt % based on total weight of the secondary battery electrolyte.

* * * * *

UNITED STATES PATENT AND TRADEMARK OFFICE
CERTIFICATE OF CORRECTION

PATENT NO. : 10,587,007 B2
APPLICATION NO. : 15/104666
DATED : March 10, 2020
INVENTOR(S) : Jin Sung Kim et al.

Page 1 of 1

It is certified that error appears in the above-identified patent and that said Letters Patent is hereby corrected as shown below:

In the Claims

Column 16, Line 62, Claim 7, delete "$LiA_1O_2$," and insert -- $LiA1O_2$ --

Signed and Sealed this
Twenty-sixth Day of May, 2020

Andrei Iancu
*Director of the United States Patent and Trademark Office*